(12) United States Patent
Hyldelund et al.

(10) Patent No.: US 11,788,513 B2
(45) Date of Patent: Oct. 17, 2023

(54) COOLER FOR A WIND TURBINE HAVING PIVOTABLE COOLING PANELS

(71) Applicant: Vestas Wind Systems A/S, Aarhus N. (DK)

(72) Inventors: Henrik Hyldelund, Solbjerg (DK); Jesper Nyvad, Egå (DK); Poul T. Tietze, Brabrand (DK); Thomas Riis Jakobsen, Vejle Øst (DK)

(73) Assignee: Vestas Wind Systems A/S, Aarhus N (DK)

( * ) Notice: Subject to any disclaimer, the term of this patent is extended or adjusted under 35 U.S.C. 154(b) by 26 days.

(21) Appl. No.: 17/634,053

(22) PCT Filed: Aug. 5, 2020

(86) PCT No.: PCT/DK2020/050227
§ 371 (c)(1),
(2) Date: Feb. 9, 2022

(87) PCT Pub. No.: WO2021/028001
PCT Pub. Date: Feb. 18, 2021

(65) Prior Publication Data
US 2022/0325701 A1    Oct. 13, 2022

(30) Foreign Application Priority Data
Aug. 14, 2019    (DK) .......................... PA 2019 70516

(51) Int. Cl.
*F03D 80/60*    (2016.01)
*F03D 80/80*    (2016.01)

(52) U.S. Cl.
CPC ............. *F03D 80/60* (2016.05); *F03D 80/80* (2016.05); *F05B 2230/60* (2013.01); *F05B 2260/02* (2013.01); *F05B 2260/20* (2013.01)

(58) Field of Classification Search
CPC ...... F03D 80/60; F03D 80/601; F03D 80/602; F03D 80/80; F05B 2230/60;
(Continued)

(56) References Cited

U.S. PATENT DOCUMENTS 9,512,823 B2 * 12/2016 Nyvad .................... F03D 80/60
2011/0140444 A1    6/2011 Winter
(Continued)

FOREIGN PATENT DOCUMENTS

WO    2010085963 A2    8/2010
WO    2014037080 A1    3/2014
(Continued)

OTHER PUBLICATIONS

Danish Patent and Trademark Office, Search and Examination Report in PA 2019 70516, dated Jan. 9, 2020.
(Continued)

*Primary Examiner* — Juan G Flores
*Assistant Examiner* — Jason G Davis
(74) *Attorney, Agent, or Firm* — Wood Herron & Evans LLP

(57) ABSTRACT

A wind turbine (10) includes a tower (12), a nacelle (14) coupled to the tower (12) and housing one or more heat generating components (18, 20), a rotor (16) having a least one wind turbine blade (24), and a cooler (38) mounted to the nacelle (14) and configured to cool the one or more heat generating components (18, 20) in the nacelle (14) by circulating a working fluid. The cooler (38) includes a support frame (46) coupled to the nacelle (14) and a heat exchanger (48) coupled to the support frame (46) and configured to cool the working fluid. The heat exchanger (48) includes at least two cooling panels (58) in non-planar relation with each other. The at least two cooling panels (50)

(Continued)

may also be pivotably coupled to each other. A method of assembling a cooler (38) is also disclosed.

20 Claims, 12 Drawing Sheets

(58) Field of Classification Search
CPC .............. F05B 2240/14; F05B 2260/02; F05B 2260/20; F05B 2260/205; F05B 2260/207; F05B 2260/221; F05B 2260/224; F05B 2260/2241
See application file for complete search history.

(56) References Cited

U.S. PATENT DOCUMENTS

| | | |
|---|---|---|
| 2012/0086215 A1 | 4/2012 | Sivalingam et al. |
| 2016/0237986 A1 | 8/2016 | Abolfazlian et al. |

FOREIGN PATENT DOCUMENTS

| | | |
|---|---|---|
| WO | 2016000715 A1 | 1/2016 |
| WO | 2018177493 A1 | 10/2018 |

OTHER PUBLICATIONS

European Patent Office, International Search Report and Written Opinion in PCT Application No. PCT/DK2020/050227, dated Oct. 29, 2020.

\* cited by examiner

COOLER FOR A WIND TURBINE HAVING PIVOTABLE COOLING PANELS

TECHNICAL FIELD

The invention relates generally to wind turbines, and more particularly to a cooler for a wind turbine having a non-planar heat exchanger arrangement formed by two or more cooling panels that may be pivotable relative to each other.

BACKGROUND

Wind turbines are used to produce electrical energy using a renewable resource and without combusting a fossil fuel. Generally, a wind turbine converts kinetic energy from the wind into electrical power. A horizontal-axis wind turbine includes a tower, a nacelle located at the apex of the tower, and a rotor having a plurality of blades and supported in the nacelle by means of a shaft. The shaft couples the rotor either directly or indirectly with a generator, which is housed inside the nacelle. Consequently, as wind forces the blades to rotate, electrical energy is produced by the generator.

The nacelle houses many different components which generate heat during operation of the wind turbine. For example, the electrical generator located within the nacelle produces a significant amount of heat during operation, which in turn causes the temperature of the air in the nacelle and the generator components to increase. When the generator components are heated, the overall efficiency of power generation may be decreased. By way of further example, the nacelle may house a gearbox or transmission for increasing the rotational speed of the input shaft to the generator relative to the rotational speed of the wind turbine rotor. During wind turbine operation, the gearbox also generates a significant amount of heat which may negatively impact efficient operation of the gearbox. The nacelle may further include other heat-generating components, including various electrical equipment (e.g., converters, inverters or the like) that do not perform optimally at high temperatures.

Accordingly, conventional wind turbines may include one or more cooling devices configured to remove the heat generated in the nacelle during operation of the wind turbine. One type of cooling device previously used to cool heat generating components of the wind turbine is a cooler top positioned along one side (e.g., the roof or sides) of the nacelle that includes one or more cooling panels partially enclosed by a support or cover. A working fluid of an on-board cooling system is circulated to the various heat generating components in the nacelle to absorb heat from these components. The heated working fluid is then directed to the cooler top where external air flowing past the wind turbine cools the working fluid flowing through the cooling panels. In other words, the working fluid transfers the heat from the heat generating components in the nacelle to the air flowing past the nacelle to thereby cool (i.e., reduce the temperature of) the components in the nacelle. From the cooler top, the (now cooled) working fluid is then circulated back to the heat generating components in the nacelle and the thermal cycle repeated to maintain a certain operating temperature within the nacelle.

As the power production per wind turbine increases, so does the required cooling capacity to maintain the wind turbine components in an optimum or satisfactory operating condition. One approach for addressing the need for higher cooling capacity is simply to make the cooler top larger. This approach, however, has some drawbacks. For example, larger cooler tops require a larger and heavier support frame to accommodate the larger forces that are imposed on the cooler top, such as for example during unexpected turbulence and/or high wind conditions. Additionally, the size of cooler tops may be limited by various regulations that govern wind turbine design. By way of example, wind turbines with helicopter or helihoist pads may have regulations that restrict the maximum height of the cooler top, such as not being higher than a railing on the pad.

In addition, current cooler top designs often increase the costs of wind turbine manufacturing and installation. By way of example, nacelles having cooler tops typically cannot be transported in an assembled state due to the size of the assembly exceeding the limits for some transport modes, such as by tractor trailer over roads or by train over the rail system. Accordingly, the cooler top is typically shipped separately from the nacelle and assembled together at the installation site. This process, however, is costly from a transportation and assembly standpoint.

Thus, there remains a need to increase the cooling capacity of a cooler top without necessarily increasing the physical size or dimensions of the cooler top. There also remains a need for a cooler top design that simplifies transport and/or assembly of the cooler top with the nacelle.

SUMMARY

A wind turbine includes a tower, a nacelle coupled to the tower and housing one or more heat generating components, a rotor having a least one wind turbine blade coupled to the nacelle, and a cooler mounted to the nacelle and configured to cool the one or more heat generating components in the nacelle through the circulation of a working fluid. The cooler includes a support frame coupled to the nacelle and a heat exchanger coupled to the support frame and configured to cool the working fluid by the passage of air through the heat exchanger. In accordance with an aspect of the invention, the heat exchanger may include at least two cooling panels in non-planar relation with each other. The non-planar arrangement of the at least two cooling panels provides an increase in surface area of the heat exchanger exposed to a passing air flow relative to an effective frontal, planar surface area provided by the cooler, which may be fixed or restricted by regulations. Thus, for a fixed size of the cooler, an increased amount of heat may be transferred from the heat generating components in the nacelle by arranging the two or more cooling panels in non-planar relation.

In one embodiment, the at least two cooling panels may each be substantially planar and form an angle relative to each other. For example, the at least two cooling panels may be angled relative to each other between about 60 degrees and about 120 degrees, and preferably about 90 degrees. In one embodiment, the heat exchanger may include two cooling panels in a V-shaped pattern. The vertex of the V-shaped pattern may be directed toward the rotor or away from the rotor of the wind turbine. In another embodiment, the heat exchanger may include more than two cooling panels arranged in a zig-zag shaped pattern. Other patterns may also be possible, such as trapezoidal-shaped patterns.

In accordance with one aspect of the invention, the at least two cooling panels may be pivotally coupled to each other. In one embodiment, for example, the at least two cooling panels may be coupled to each other by a hinge, such as by a living hinge or a more traditional hinge. In one embodiment, the hinge may be configured as a double hinge allowing the at least two cooling panels to pivot relative to each other in multiple directions and over a greater range of angles. In one embodiment, the hinge may be configured as a lockable hinge so as to selectively fix the relative positions of the at least two cooling panels. The pivotable coupling of the at least two cooling panels allows the heat exchanger to be movable between a collapsed configuration and an expanded configuration.

In one embodiment, the at least two cooling panels may be arranged substantially vertically relative to each other, and each of the at least two cooling panels may define a confronting edge that extends in a generally vertical direction. In another embodiment, and where the at least two cooling panels are pivotally coupled to each other, the at least two cooling panels may be arranged substantially horizontally relative to each other, and each of the at least two cooling panels may define a confronting edge that extends in a substantially vertical direction.

In another embodiment, a cooler for a wind turbine having a nacelle includes a support frame configured to be mounted to the nacelle and a heat exchanger configured to be coupled to the support frame. The heat exchanger includes at least two cooling panels pivotally connected to each other and movable between a collapsed configuration and an expanded configuration. The volume occupied by the heat exchanger in the collapsed configuration is less than, and perhaps significantly less than, the volume occupied by the heat exchanger in the expanded configuration. In an exemplary embodiment, the collapsed configuration includes a stacked arrangement of the two or more cooling panels with one cooling panel being positioned immediately adjacent another cooling panel. For example, the at least two cooling panels may be generally planar and the collapsed configuration may include a generally rectangular stacked arrangement of the two or more cooling panels. The reduced size of the heat exchanger when in the collapsed configuration may provide certain benefits to the transport and assembly of the cooler.

In yet another embodiment, a method of assembling a cooler for a wind turbine having a nacelle includes mounting a support frame to the nacelle of the wind turbine; providing a heat exchanger having at least two cooling panels pivotally connected to each other and movable between a collapsed configuration and an expanded configuration; positioning the heat exchanger adjacent the support frame in the collapsed configuration; connecting one end of the heat exchanger to the support frame; moving the heat exchanger from the collapsed configuration to the expanded configuration; and connecting a second end of the heat exchanger to the support frame to secure the heat exchanger to the support frame, wherein the at least two cooling panels of the heat exchanger are in non-planar relation with each other.

In one embodiment, the collapsed configuration is a horizontally stacked arrangement of the two or more cooling panels, and the moving step further includes moving the stacked arrangement in a substantially horizontal direction in order to couple the heat exchanger to the support frame. In another embodiment, the collapsed configuration is a vertically stacked arrangement of the two or more cooling panels, and the moving step further includes moving the stacked arrangement in a substantially vertical direction in order to couple the heat exchanger to the support frame.

In a further embodiment, a method of handling a wind turbine having a cooler includes providing a nacelle of the wind turbine at a first location; providing a heat exchanger at the first location, the heat exchanger having at least two cooling panels pivotally connect to each other and movable between a collapsed configuration and an expanded configuration; coupling the heat exchanger to the nacelle and positioning the heat exchanger in the collapsed position; and transporting the nacelle to a second location separate from the first location with the collapsed heat exchanger coupled thereto. The first location may be a manufacturing facility and the second location may be the installation site for the wind turbine, for example. The method may further include hoisting the nacelle to the top of the wind turbine tower with the collapsed heat exchanger coupled thereto. Additionally, the method may include mounting the support frame to the nacelle; moving the heat exchanger from the collapsed configuration to the expanded configuration; and coupling the heat exchanger to the support frame. The mounting, moving and coupling steps may occur prior to the nacelle being hoisted to the top of the tower, such as on the ground or deck of a ship. Alternatively, the mounting, moving and coupling steps may occur subsequent to the nacelle being hoisted to the top of the tower.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

DETAILED DESCRIPTION

Figure 1:
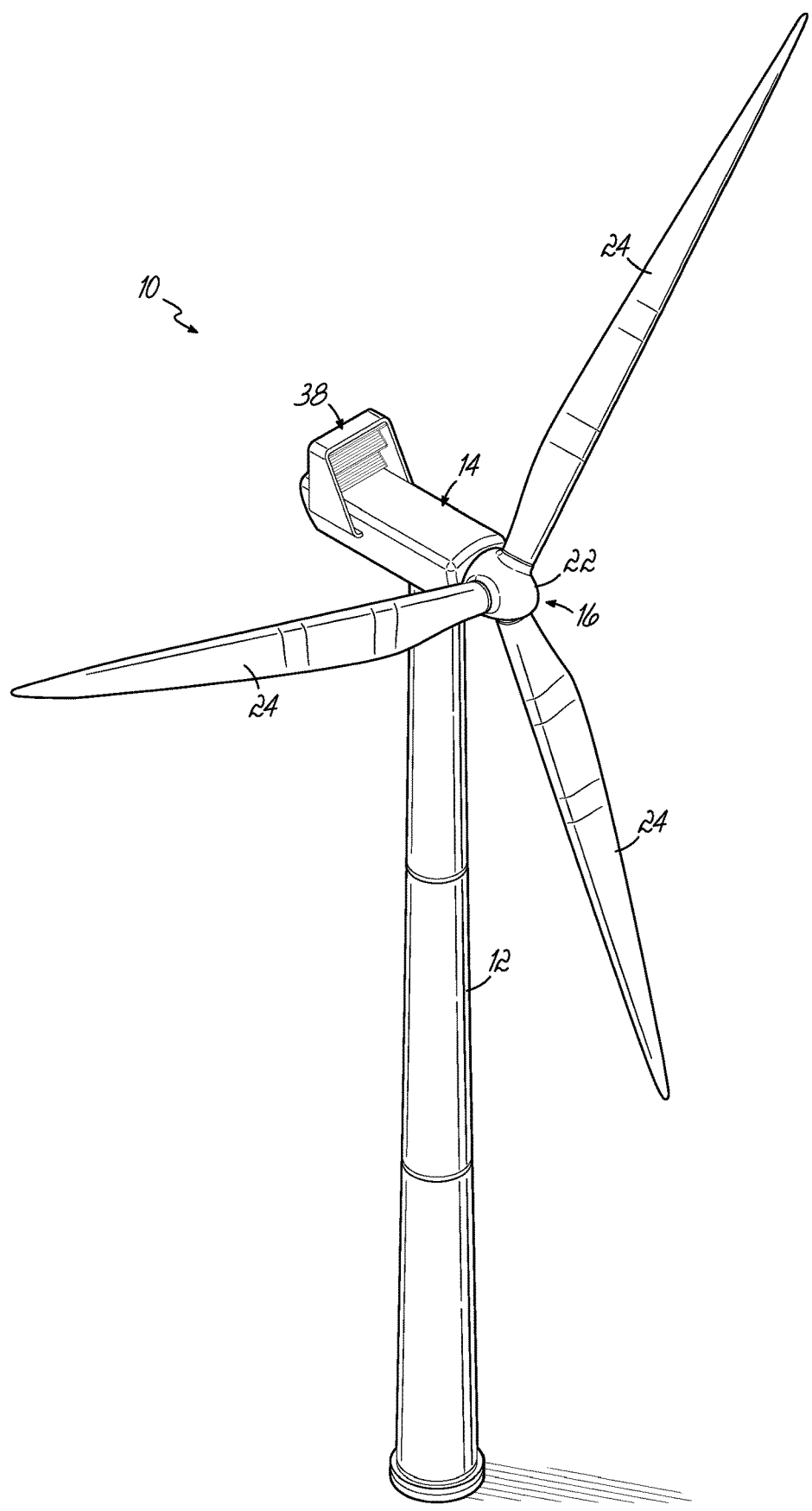
FIG. 1 is a perspective view of a wind turbine having a cooler in accordance with an embodiment of the invention.
Figure 2:
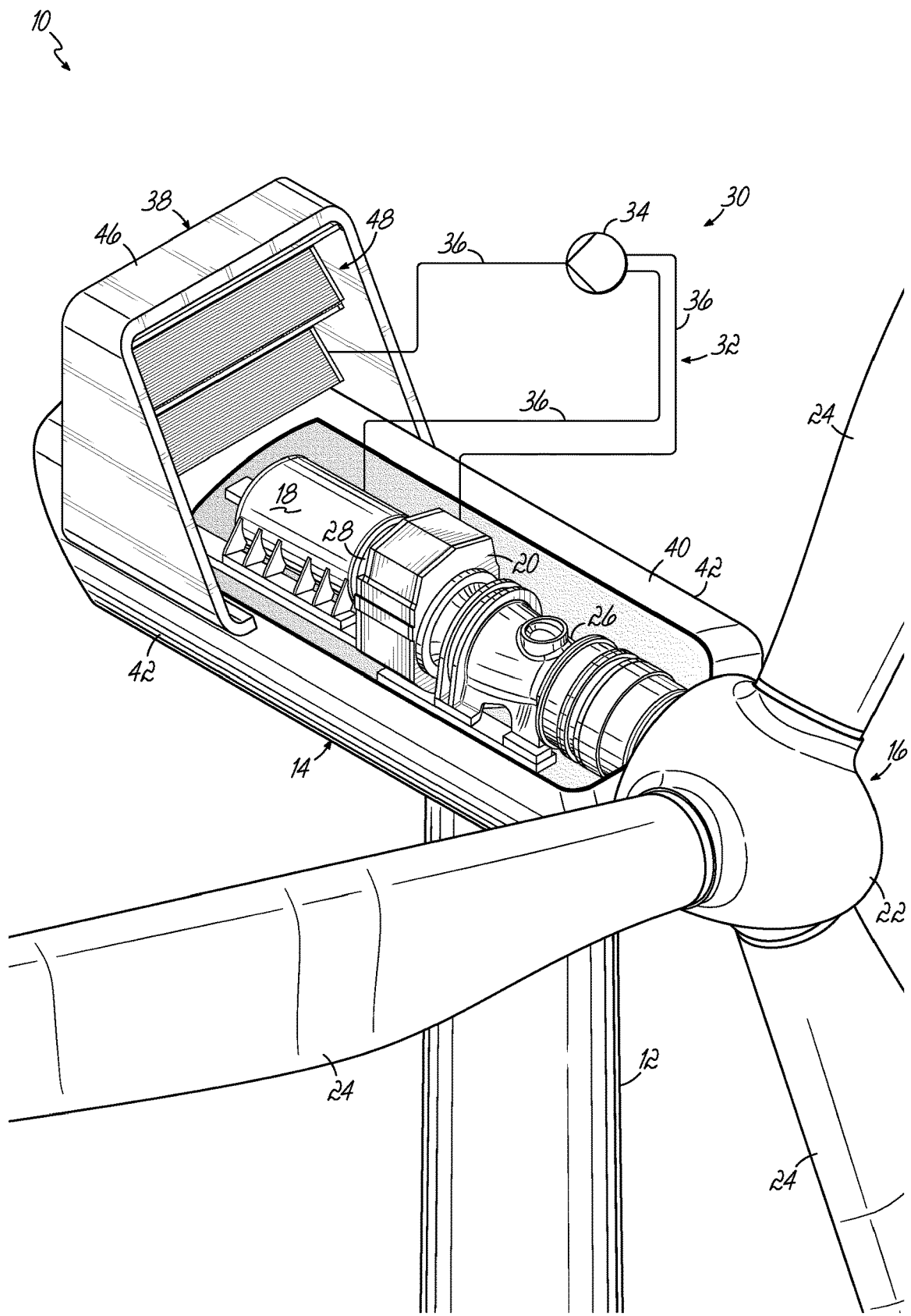
FIG. 2 is an enlarged partial perspective view of the wind turbine of FIG. 1 illustrating heat generating components in the nacelle.
Figure 3:
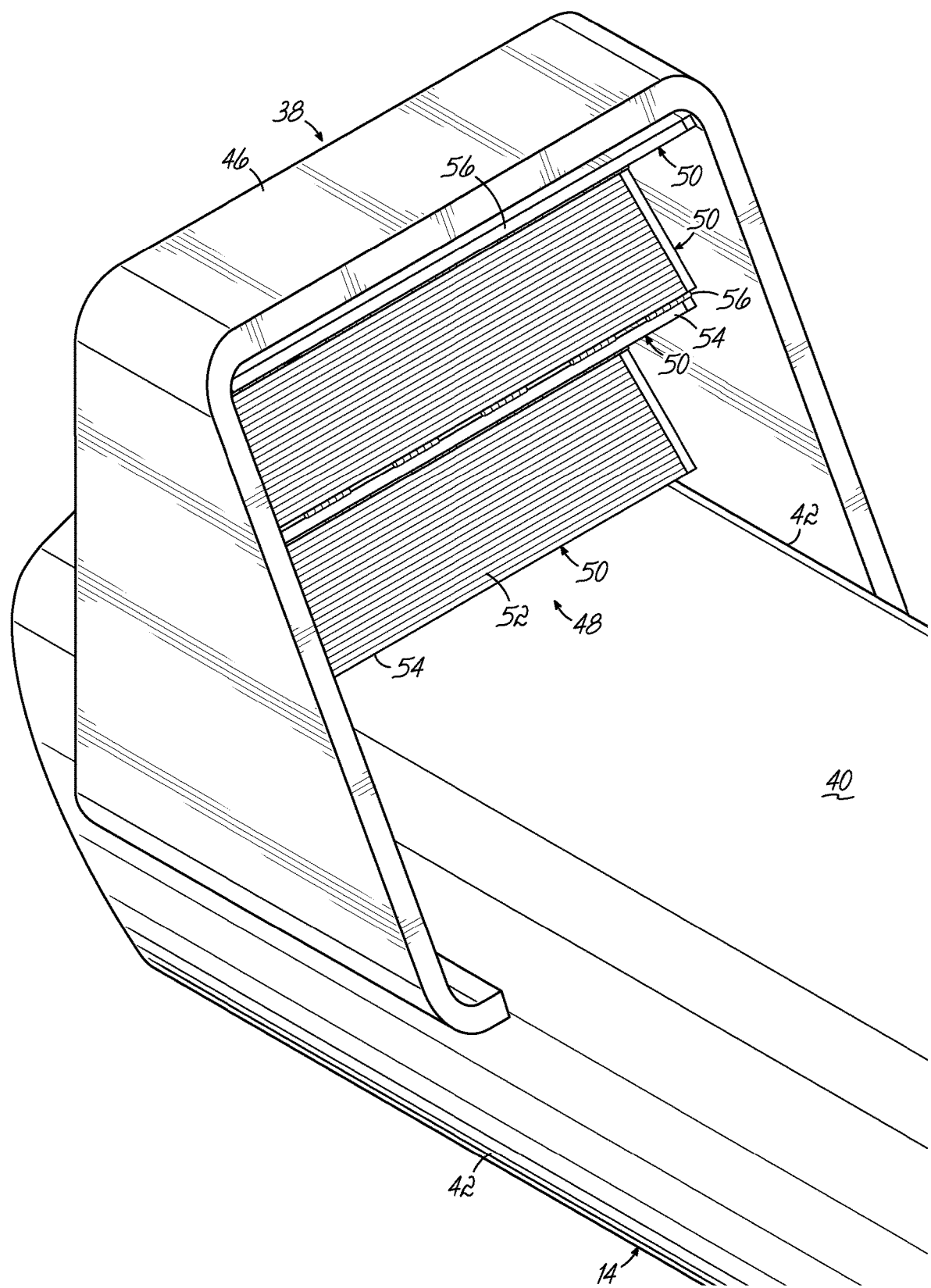
FIG. 3 is an enlarged partial perspective view of the cooler shown in FIG. 1.

With reference to FIGS. 1 and 2, a wind turbine 10 includes a tower 12, a nacelle 14 disposed at the apex of the tower 12, and a rotor 16 operatively coupled to a generator 18, and a gearbox 20 housed inside the nacelle 14. In addition to the generator 18 and gearbox 20, the nacelle 14 may house various components needed to convert wind energy into electrical energy and to operate and optimize the performance of the wind turbine 10. The tower 12 supports the load presented by the nacelle 14, rotor 16, and other wind turbine components housed inside the nacelle 14 and operates to elevate the nacelle 14 and rotor 16 to a height above ground level or sea level, as may be the case, at which air currents having lower turbulence and higher velocity are typically found.

The rotor 16 may include a central hub 22 and a plurality of blades 24 attached to the central hub 22 at locations distributed about the circumference of the central hub 22. In the representative embodiment, the rotor 16 includes three blades 24, however the number may vary. The blades 24, which project radially outward from the central hub 22, are configured to interact with passing air currents to produce rotational forces that cause the central hub 22 to spin about its longitudinal axis. The design, construction, and operation of the blades 24 are familiar to a person having ordinary skill in the art of wind turbine design and may include additional functional aspects to optimize performance. For example, pitch angle control of the blades 24 may be implemented by a pitch control mechanism (not shown) responsive to wind velocity to optimize power production in low wind conditions, and to feather the blades if wind velocity exceeds design limitations.

The rotor 16 may be coupled to the gearbox 20 directly or, as shown, indirectly via by a drive shaft 26. Either way, the gearbox 20 transfers the rotation of the rotor 16 through a coupling 28 to the generator 18. Wind exceeding a minimum level may activate the rotor 16, causing the rotor 16 to rotate in a direction substantially perpendicular to the wind, applying torque to the input shaft of the generator 18. The electrical power produced by the generator 18 may be supplied to a power grid (not shown) or an energy storage system (not shown) for later release to the grid as understood by a person having ordinary skill in the art. In this way, the kinetic energy of the wind may be harnessed by the wind turbine 10 for power generation.

The generator 18, gearbox 20 and possibly other components housed in the nacelle 14 generate a significant amount of heat during operation of the wind turbine 10. To optimize or improve operation of the wind turbine 10, the heat produced by these heat generating components must be properly managed and exhausted to the external environment. To this end, the wind turbine 10 may include a cooling system 30 for transferring the heat from the heat generating components 18, 20 to the external environment 32. In a typical arrangement, the cooling system 30 includes a thermal circuit 32 having a pump 34 that circulates a working fluid, such as water or other suitable refrigerant, through conduit lines 36 between the heat generating components 18, 20 in the nacelle 14 and a heat-exchanging cooler 38. The cooler 38 is positioned external to the nacelle 14 and is typically mounted to a surface of the nacelle 14, such as the roof 40 of the nacelle 14 or one or more sidewalls 42 of the nacelle 14. In any event, the cooler 38 is exposed to an external air flow that may be used to achieve a cooling effect.

In use, the cooling system 30 is arranged to provide the working fluid to the heat generating components 18, 20 where the working fluid picks up or absorbs heat from the heat generating components 18, 20. One or more heat exchangers may be provided to efficiently transfer heat from the heat generating components 18, 20 in the nacelle 14 to the working fluid of the cooling system 30. The pump 34 of the cooling system 30 then directs the heated working fluid to the cooler 38. As noted above, the cooler 38 is typically positioned external to the nacelle 14 behind the rotor 16 and is subject to an air flow through the cooler 38. The passage of the air through the cooler 38 causes the heat in the working fluid to transfer to the external air, thus cooling the working fluid. The now cooled working fluid is directed back to the heat generating components 18, 20 in the nacelle 14 under the direction of the pump 34 and the cycle is repeated. The cooling system 30 essentially transfers heat from inside the nacelle 14 to the external environment in order to maintain the operating temperature of the wind turbine components 18, 20 at a suitable level that provides efficient operation of the wind turbine 10.

As illustrated in FIGS. 3-7, 9 and 10, the cooler 38 generally includes a support frame 46 coupled to the exterior of the nacelle 14, such as to the roof 40 or sidewalls 42, and a heat exchanger 48 coupled to the support frame 46. The heat exchanger 48 is operatively coupled to the thermal circuit 32 that carries the working fluid and is exposed to the external air flow for removing heat from the working fluid. In an exemplary embodiment, the heat exchanger 48 may include two or more cooling panels 50 arranged adjacent each other to form the heat exchanger 48. In one aspect of the invention, the two or more cooling panels 50 may have a non-planar relationship relative to each other such that the two or more cooling panels 50 do not lie within the same plane. By arranging the cooling panels 50 in a non-planar configuration, the surface area over which heat transfer occurs may be increased relative to, for example, the effective planar frontal area of the heat exchanger 48. Thus, the amount of heat removed from the working fluid will be correspondingly increased. In other words, for a given size of the cooler 38 (i.e., the frontal area of the heat exchanger 48 being fixed), the cooling capacity of the cooler 38 may be increased by arranging the cooling panels 50 in a non-planar configuration within the support frame 46.

Figure 4:
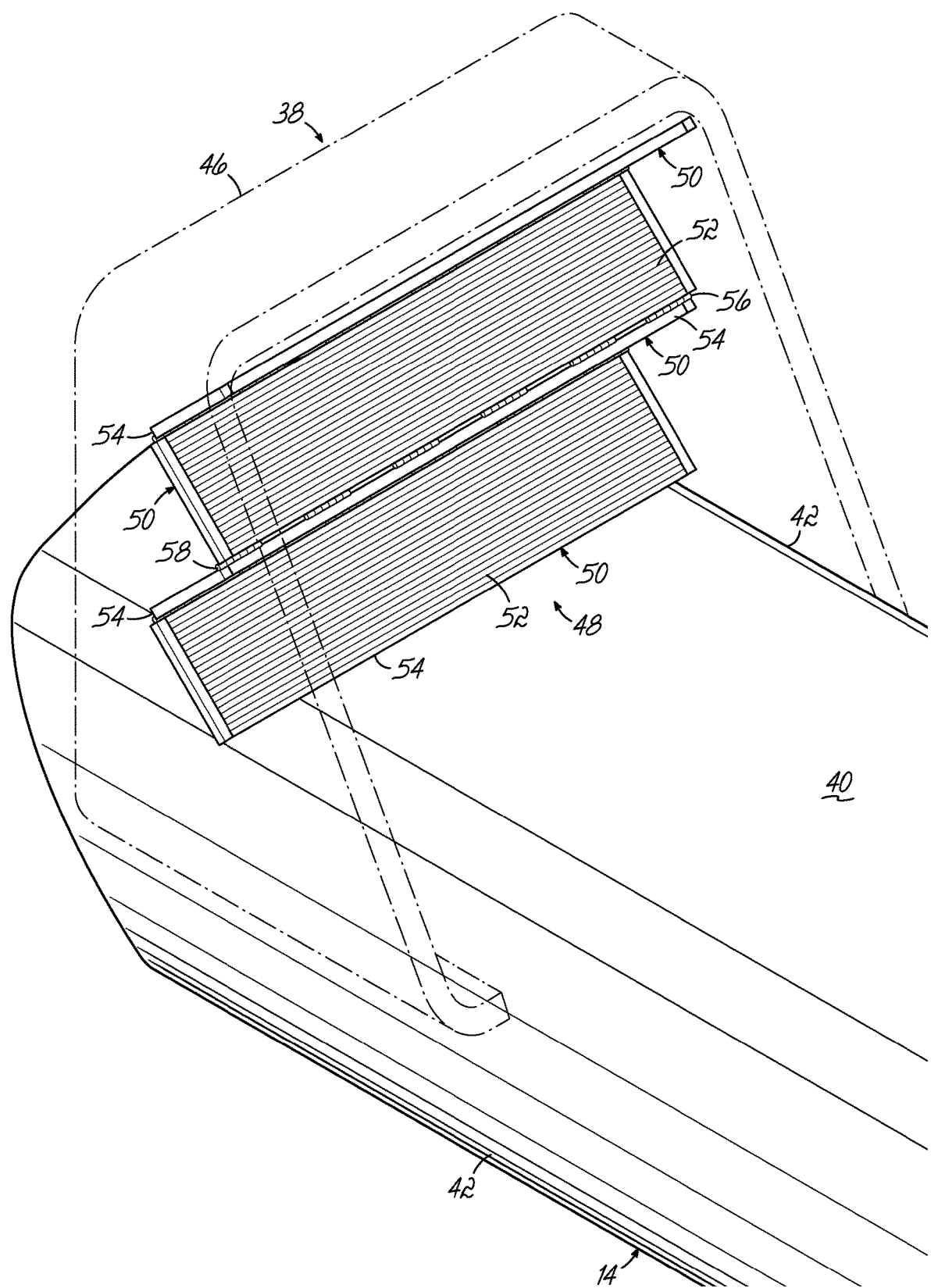
FIG. 4 is another enlarged partial perspective view of the cooler shown in FIG. 1 with the support frame of the cooler removed.
Figure 5:
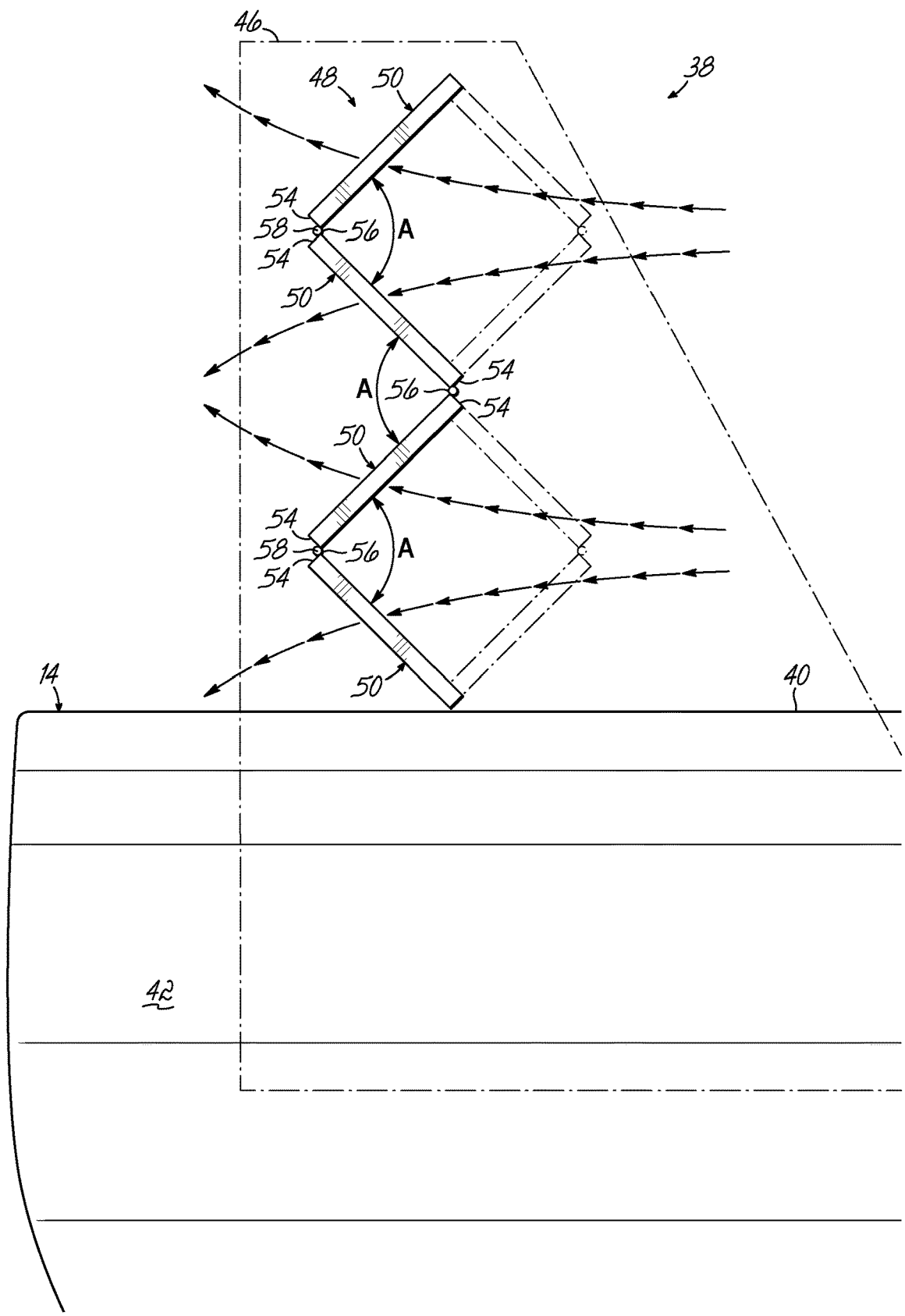
FIG. 5 is an enlarged side view of the cooler illustrated in FIG. 4.
Figure 6A:
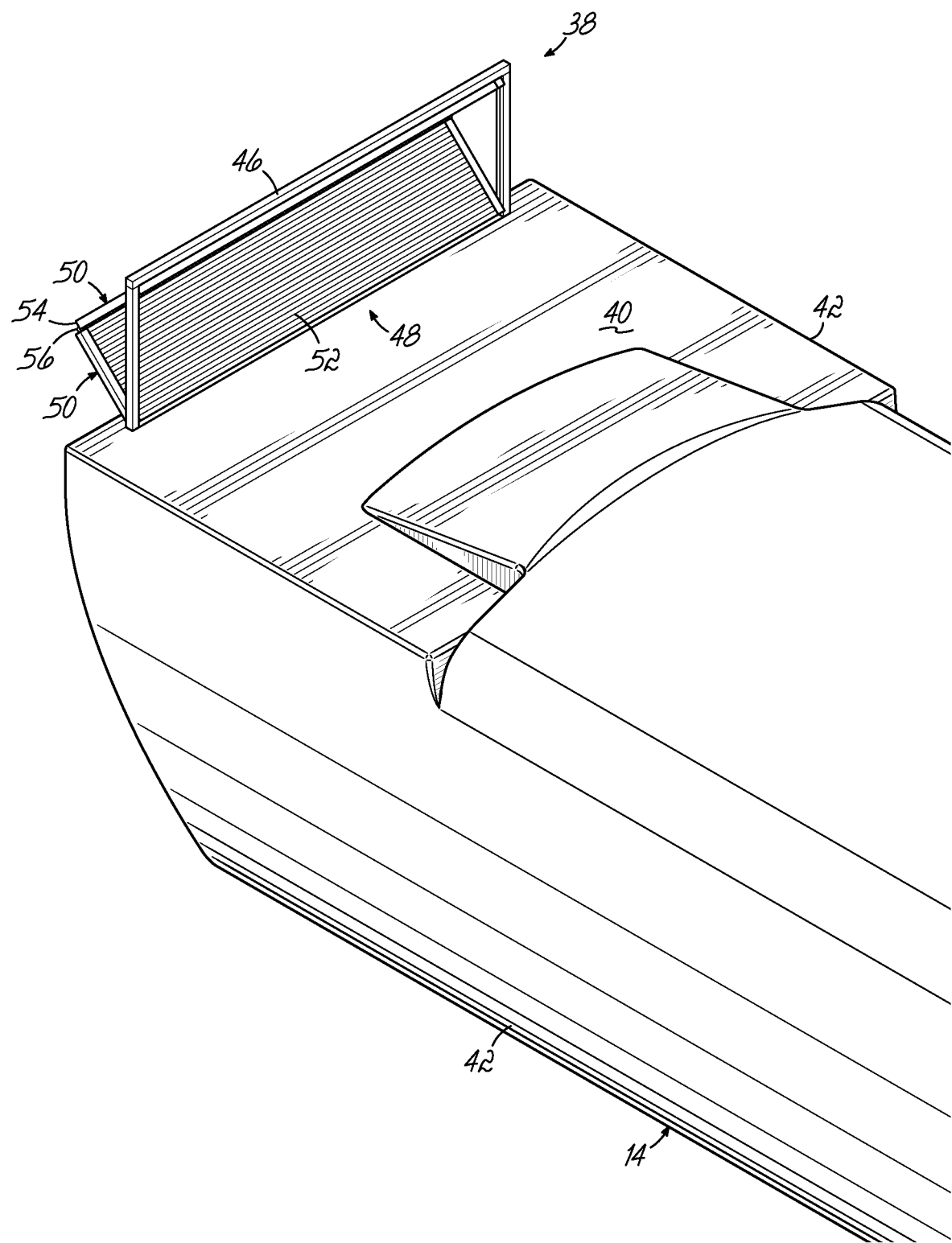
FIG. 6A is an enlarged perspective schematic view of a cooler in accordance with an embodiment of the invention.
Figure 7:
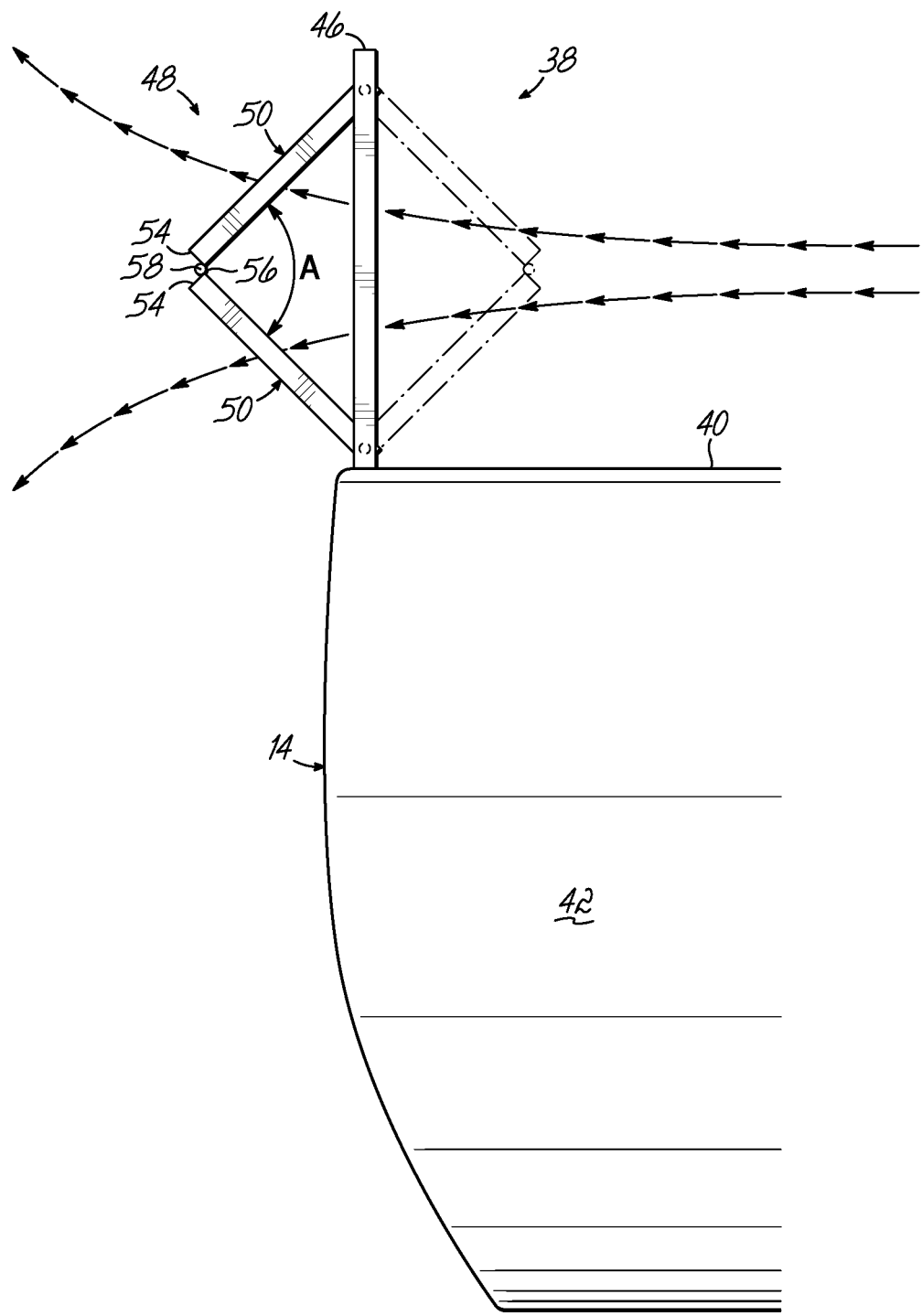
FIG. 7 is an enlarged side view of the cooler illustrated in FIG. 6.

In one embodiment and as illustrated in FIGS. 6A and 7, the heat exchanger 48 may be formed by two generally planar, rectangular cooling panels 50 arranged relative to each in a V-shaped pattern. Such an arrangement generally defines an inclusive angle A between the two panels 50. In various embodiments, the inclusive angle A may range from about 60 degrees to about 120 degrees, and more preferably between about 80 degrees and about 100 degrees. In an exemplary embodiment, the cooling panels 50 may have an inclusive angle of about 90 degrees. In an alternative embodiment and as illustrated in FIGS. 4 and 5, the heat exchanger 48 may be formed by more than two generally planar, rectangular cooling panels 50, such as between 4-10 cooling panels 50 (four shown). In this case, adjacent cooling panels 50 may have an alternating a V-shaped pattern such that the heat exchanger 48 as a whole may have a zig-zag pattern. The V-shaped pattern (i.e., for two cooling panels 50) and the zig-zag pattern (i.e., for more than two cooling panels 50) are exemplary and other non-planar patterns of cooling panels 50 may be envisaged within the scope of the invention.

Figure 6B:
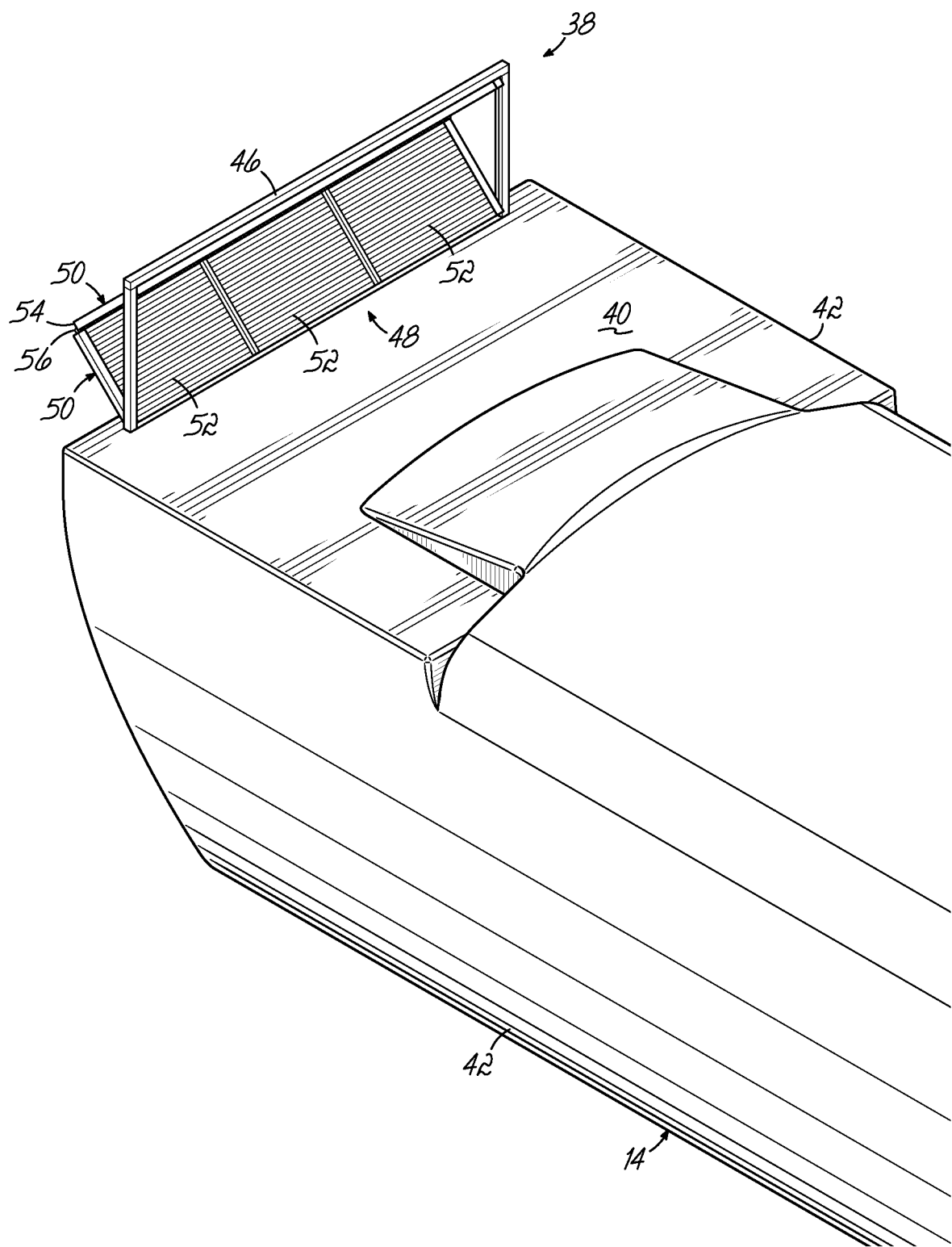
FIG. 6B is an enlarged perspective schematic view of a cooler in accordance with an alternative embodiment of the invention.

In one embodiment the cooling panels 50 may be formed by one or more cooling elements 52. A cooling element 52 may be the smallest elemental unit of the heat exchanger 48 configured to exchange heat with the working fluid. By way of example and without limitation, a cooling element 52 may include a pair of manifolds (e.g., high temperature manifold and low temperature manifold) and a plurality of thin, spaced-apart tubes extending between the two manifolds). The working fluid flows through the tubes and the external air flows through the spaces between adjacent tubes to cool the working fluid. In any event, in one embodiment, the cooling panel 50 may be formed as a single cooling element 52, as shown in FIG. 6. In an alternative embodiment and as illustrated in FIG. 6B, the cooling panel 50 may be formed from a plurality of cooling elements 52 positioned adjacent each other and preferably connected to each other to form the generally planar cooling panel 50. In any event, each cooling panel 50 may be formed by a single cooling element 52 or a plurality of coupled cooling elements 52.

The arrangement of the two or more cooling panels 50 to form the heat exchanger 48 may have a wide variety of configurations. By way of example and without limitation, in one embodiment, the cooling panels 50 may be arranged substantially horizontally relative to each other such that confronting edges 54 of adjacent cooling panels 50 form the vertex of the V-shape and extend in a substantially vertical direction. Such an arrangement is shown, for example, in FIGS. 9 and 10. This provides heat exchanger 48 with a corrugated profile substantially in the horizontal direction. In another embodiment, the cooling panels 50 may be arranged substantially vertically relative to each other such that confronting edges 54 of adjacent cooling panels 50 form the vertex of the V-shape and extend in a substantially horizontal direction. This provides heat exchanger 48 with a corrugated profile substantially in the vertical direction. Such an arrangement is shown, for example, in FIGS. 4-7. In describing the cooling panels 50 as being arranged substantially horizontally or substantially vertically, this reference pertains to the general relationship between adjacent panels and does not relate to the direction that the working fluid flows through the cooling panels 50.

In one embodiment, the cooling panels 50 may have a fixed relation relative to each other. For example, the cooling panels 50 may be fixed in a V-shaped pattern or a zig-zag pattern. In a preferred embodiment, however, the cooling panels 50 may be movably coupled to each other. By way of example, the cooling panels 50 may be pivotally coupled to each other at one or more locations along confronting edges 54 of adjacent cooling panels 50 to define a pivot joint 56 (see FIGS. 4-7, 9 and 10). In one embodiment, the pivot joint 56 may be defined by a hinge 58, such as a living hinge or more traditional hinges provided by mechanical elements. For example, a flexible material, such as spring steel or the like, may couple the confronting edges 54 of adjacent cooling panels 50 to provide a living hinge. Alternatively, a hinge device defining a pivot axis disposed between the two cooling panels 50 may be used along the confronting edges 54. Such hinges are generally well known by those of ordinary skill in the art. Moreover, those of ordinary skill in the art may recognize other arrangements or devices that permit pivotal movement between adjacent cooling panels 50 that remain within the scope of the present invention.

In one embodiment, the hinge 58 may be a double hinge that allows the coupled cooling panels 50 to pivot relative to each other through a greater sweep angle and in multiple directions. This may allow, for example, the cooling panels 50 to be arranged into a greater number of configurations. For example, the vertex of adjacent V-shaped panels 50 may be positioned away from the rotor 16 or toward the rotor 16 (as illustrated in phantom in FIGS. 5, 7 and 10). Double hinges are generally well known to those of ordinary skill in the art and will not be further described herein. Furthermore, in an exemplary embodiment, the hinge 58 may be configured as a lockable hinge that fixes the relative positions of the cooling panels 50 once the hinge 58 is placed in a locked position. In an alternative embodiment, the locking mechanism may be separate from the hinge 58 and may include various brackets, posts, struts, bolts or other fasteners that selectively secure the relative position of the adjacent cooling panels 50 in place.

The ability of the cooling panels 50 to move or pivot relative to each other may provide some advantages to wind turbine manufacturers. By way of example, certain benefits may be provided in the transportation of wind turbine components to an installation site. When heat exchangers for existing coolers are transported to an installation site, the cooling panels are typically arranged in their in-use, fixed configuration. In this configuration, the heat exchanger occupies a significant amount of space, whether that be on a truck, train or on a deck of a ship. The relatively large size of the heat exchanger not only makes transport more complex and challenging, but also makes it more costly.

In one aspect of the invention, because the cooling panels 50 of the heat exchanger 48 are movable relative to each other, and more specifically pivotable relative to each other, the heat exchanger 48 may be movable between an expanded configuration and a collapsed configuration, such as by relative movement in at least one direction. In the expanded configuration, the heat exchanger 48 may be arranged to be in its in-use configuration in the cooler 38. Thus, in various embodiments, the heat exchanger 48 may be in its V-shaped pattern, zig-zag pattern or other pattern in the expanded configuration. Moreover, in the expanded configuration, the heat exchanger 48 occupies a first amount of space or volume. For example, if one were to place the expanded heat exchanger 48 in a container of some type for shipping (not shown), the container would be rather large and occupy a significant volume. In the collapsed configuration, however, the heat exchanger 48 is arranged to occupy significantly less space or volume. Again, if one were to place the collapsed heat exchanger 48 in a container of some type for shipping (not shown), that container would be smaller and occupy less volume. By way of example, the reduction in space (as defined by volume of a container that encloses the heat exchanger) may be between 20%-40%. Thus, transporting the heat exchanger 48 from the manufacturing facility to the installation site may be tremendously improved, from both a logistic and cost perspective, due to the ability of the heat exchanger 48 to transition to a more compact, collapsed configuration.

In an exemplary embodiment, the collapsed configuration of the heat exchanger 48 may be a stacked configuration of the cooling panels 50. In other words, the hinges 58 connecting adjacent cooling panels 50 may be arranged such that the cooling panels 50 of the heat exchanger 48 may be positioned immediately adjacent one another, either in contact with one another or in near contact with one another (e.g., 0-20 cm apart), and the area of the cooling panels 50 may be generally parallel to each other and align or overlap with each other. Such a configuration is referred to herein as a stacked configuration or arrangement. Depending on the arrangement of the heat exchanger 48 in the in-use position (e.g., a substantially horizontal arrangement of the cooling panels 50 or a substantially vertical arrangement of the cooling panels 50), the stacked arrangement may for a horizontal stack or a vertical stack of cooling panels 50. For example, in a horizontal stack, the cooling panels 50 of the heat exchanger 48 may be arranged next to one another in a horizontal direction. Thus, to move the heat exchanger 48 toward the expanded configuration, the cooling panels 50 may be pulled apart in a substantially horizontal direction. In a vertical stack, the cooling panels of the heat exchanger 48 may be arranged next to one another in a vertical direction. Thus, to move the heat exchanger 48 toward the expanded configuration, the cooling panels 50 may be pulled apart in a substantially vertical direction.

In addition to the above, the ability to move the heat exchanger 48 between collapsed and expanded configurations provides certain benefits in the assembly of the wind turbine 10, and more particularly the cooler 38. In this regard, in an exemplary embodiment, the cooler 38 may be assembled to the nacelle 14 by first coupling the support frame 46 to the nacelle 14. Next, the heat exchanger 48 may be positioned adjacent the support frame 46 in its collapsed configuration (e.g., stacked arrangement). While in the collapsed configuration, one portion of the heat exchanger 48, such as one of the cooling panels 50, may be coupled to the support frame 46 at a first location. Then, the heat exchanger 48 may be moved toward its expanded position, where another portion of the heat exchanger 48, such as another cooling panel 50, may be coupled to the support frame 46 at a second location that is, for example, different than the first location.

Figure 11A:
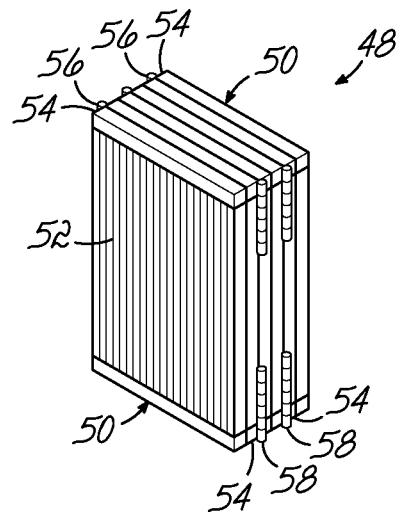
FIGS. 11A and 11B illustrate a heat exchanger in a collapsed and expanded configuration in accordance with an embodiment of the invention.
Figure 11B:
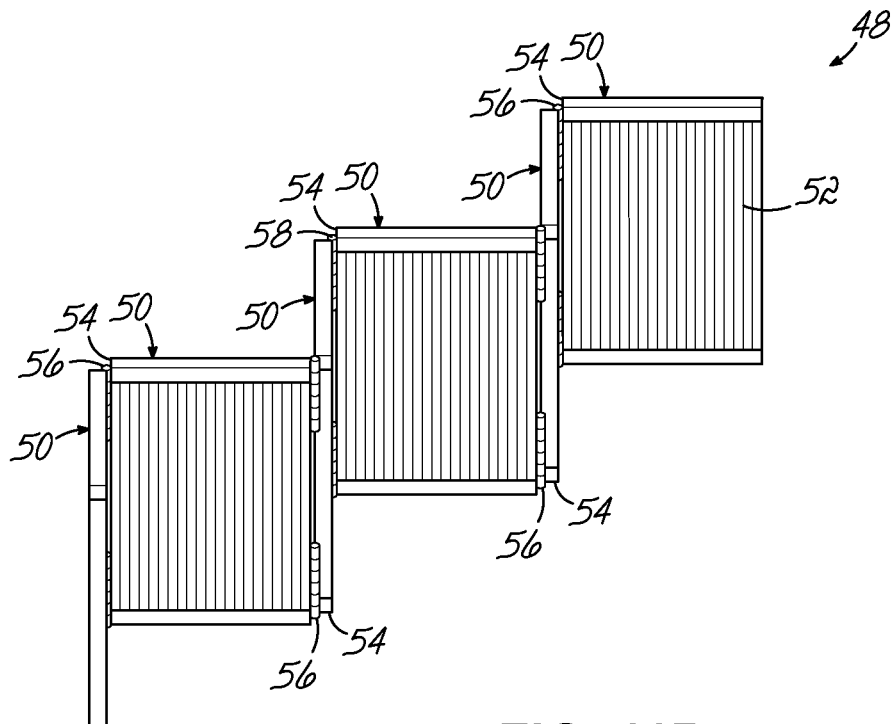

By way of example, for a horizontally arranged heat exchanger 48 (and viewing the cooler 38 from the front), the collapsed heat exchanger 48 (FIG. 11A) may be positioned generally within the support frame 46 attached to the nacelle 14. In one embodiment, the left-most cooling panel 50 may be coupled to the left support of the support frame 46. Next, the right-most cooling panel 50 may be pulled toward the right to expand the heat exchanger 48. When the heat exchanger 48 is in the expanded configuration (FIG. 11B), the right-most cooling panel 50 may be coupled to the right support of the support frame 46 and thereby secure the heat exchanger 48 to the support frame 46. Of course, in an alternative embodiment a similar process may be used but starting with the right side of the collapsed heat exchanger 48.

Figure 8A:
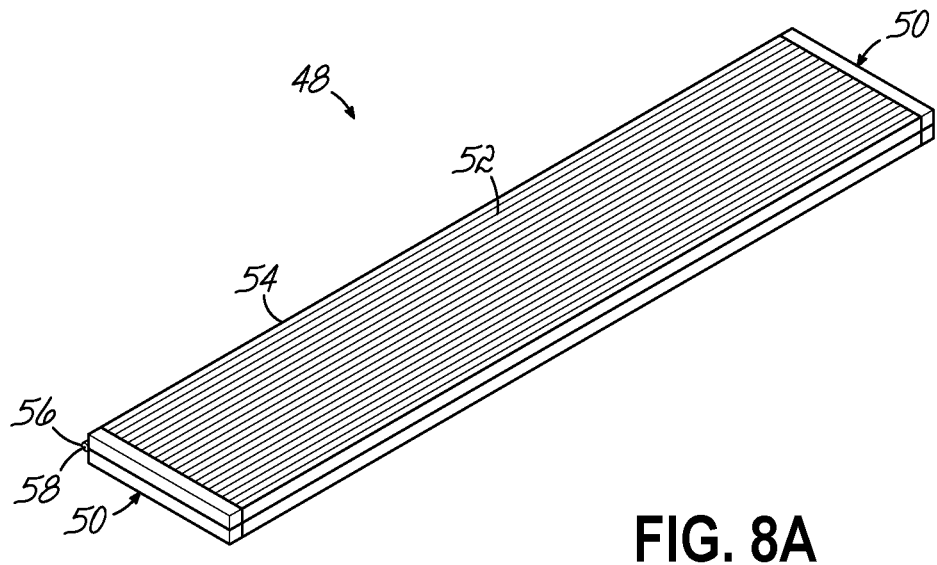
FIGS. 8A and 8B illustrate a heat exchanger in a collapsed and expanded configuration in accordance with an embodiment of the invention.
Figure 8B:
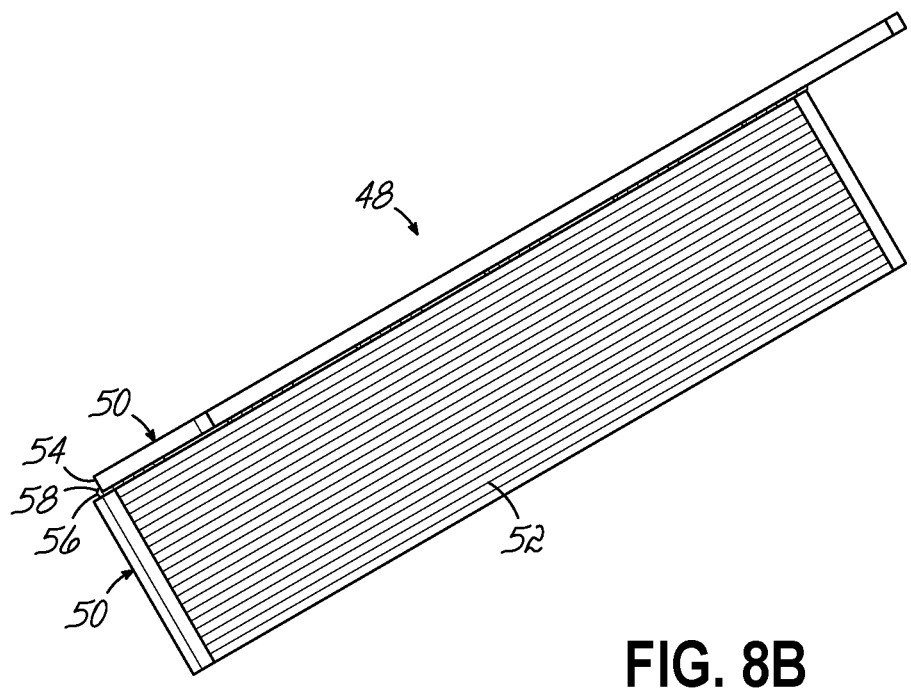
Figure 9:
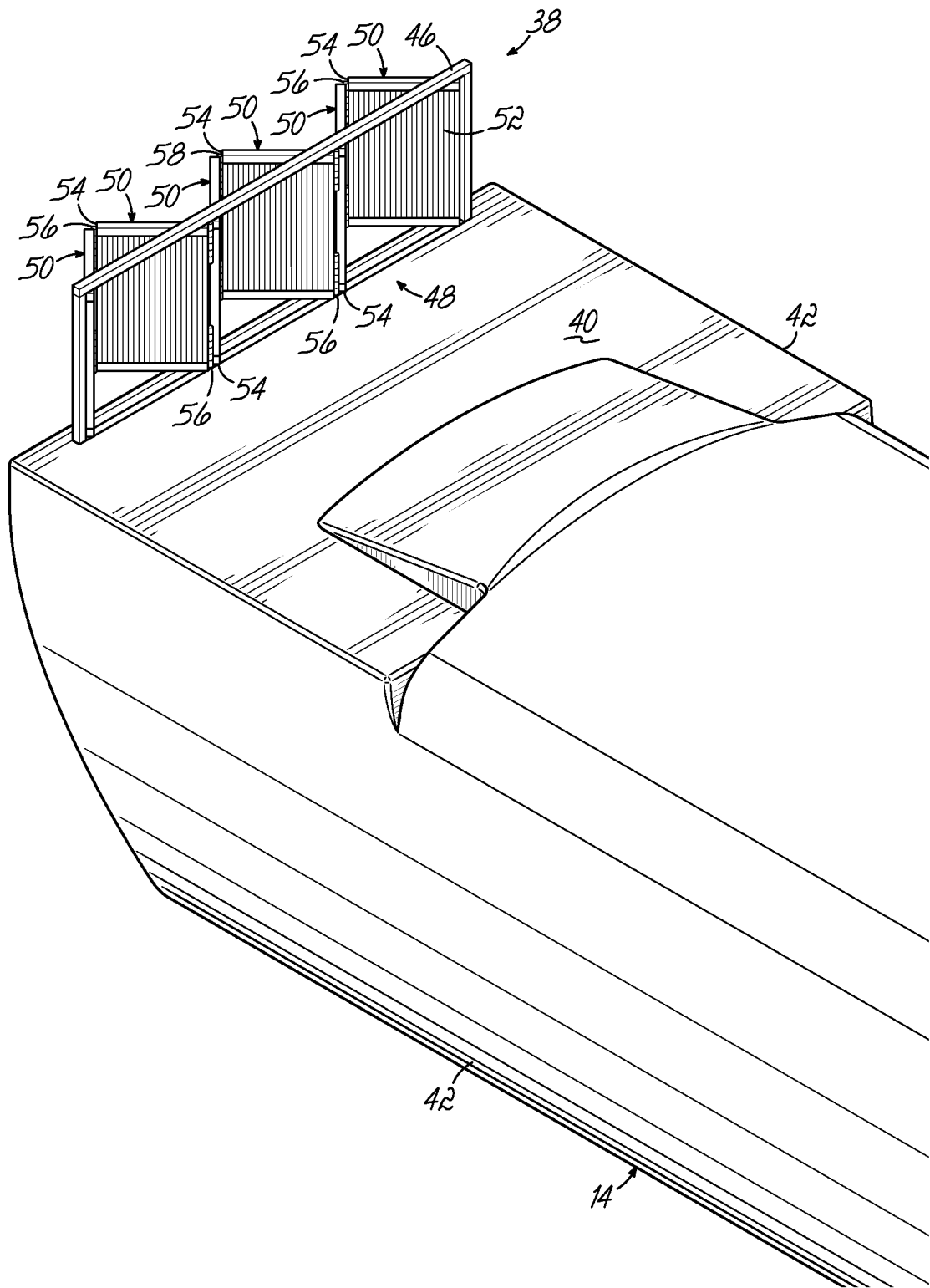
FIG. 9 is an enlarged perspective schematic view of a cooler in accordance with an embodiment of the invention.
Figure 10:
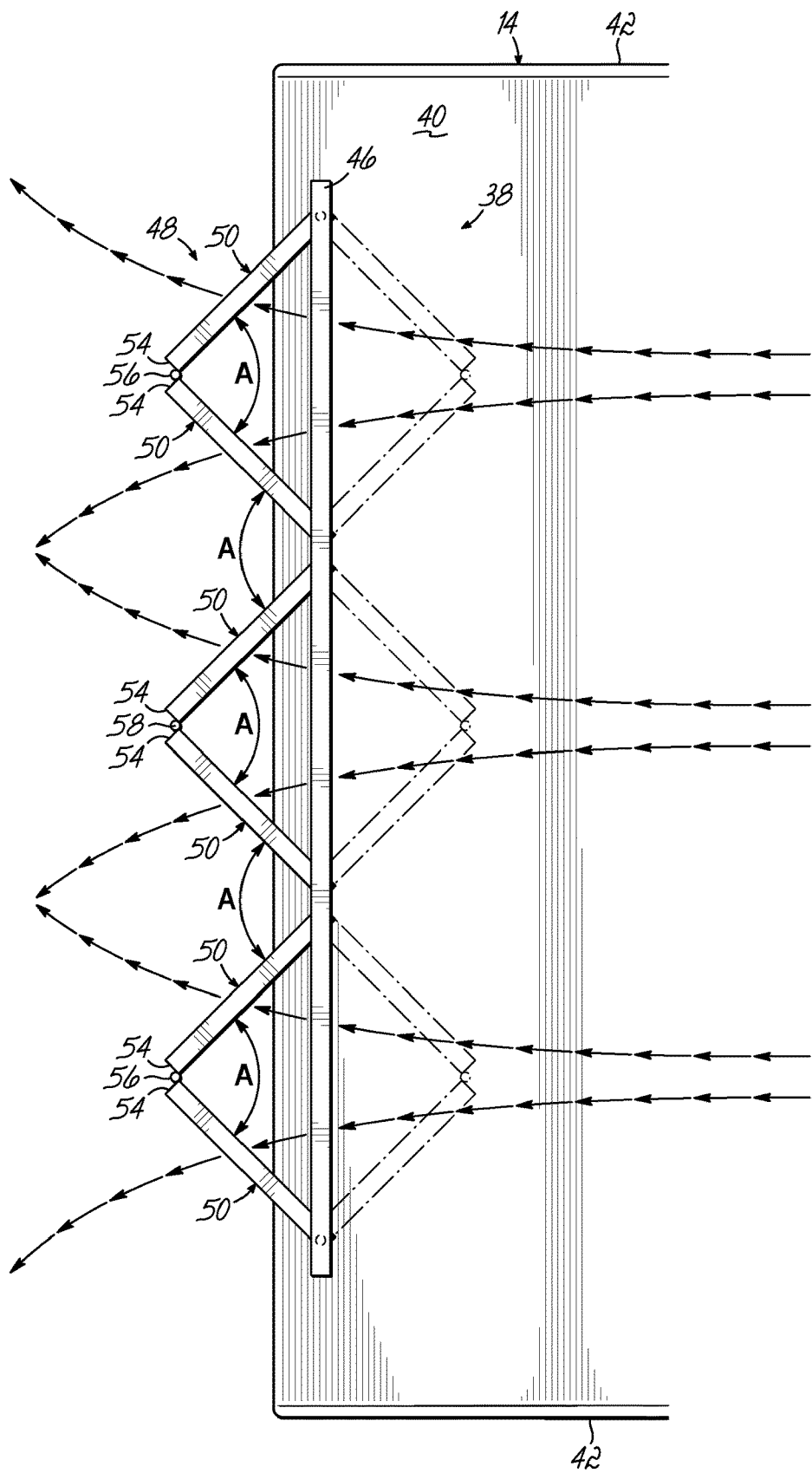
FIG. 10 is an enlarged the view of the cooler illustrated in FIG. 9.

In a similar manner, for a vertically arranged heat exchanger 48, the collapsed heat exchanger 48 (FIG. 8A) may be positioned generally within the support frame 46 attached to the nacelle 14. In an exemplary embodiment, the lower-most cooling panel 50 may be coupled to the left and right supports of the support frame 46 and/or to the nacelle 14 or lower support of the support frame 46. Next, the upper-most cooling panel 50 may be pulled upwardly to expand the heat exchanger 48. When the heat exchanger 48 is in the expanded configuration (FIG. 11B), the upper-most cooling panel 50 may be coupled to the left and right support of the support frame 46 and/or to the upper support of the support frame 46, to thereby secure the heat exchanger 48 to the support frame 46.

From the description above, it should be understood that the assembly of the cooler 38 may be significantly improved, from both a time and cost perspective, by the movable or pivotable nature of the cooling panels 50 of the heat exchanger 48. In one embodiment, the assembly of the cooler 38 may occur when the nacelle 14 is not yet assembled to the wind turbine tower 12, such as when the nacelle 14 is on the ground or on the deck of a ship. Alternatively, the assembly of the cooler 38 may occur after the nacelle 14 has been placed on the wind turbine tower 12. In this case, another benefit may be provided by the ability to collapse or stack the heat exchanger 48. More particularly, the heat exchanger 48 is hoisted to the top of the nacelle 14 by the installation crane (not shown) for assembly to the support frame 46. In an exemplary embodiment, the assembly crane may hoist the heat exchanger 48 to the top of the tower 12 and the top of the nacelle 14 when it is in the collapsed configuration. Once the heat exchanger 48 is properly positioned relative to the support frame 46 on the nacelle 14, the heat exchanger 48 may be moved toward its expanded configuration as described above.

Because the heat exchanger 48 is configured to occupy a relatively small amount of space in the collapsed configuration, in an alternative embodiment, it may be possible to position at least the heat exchanger 48 on the nacelle 14 at the manufacturing facility (e.g., such as with temporary fasteners or the like) and transport the nacelle 14 with the attached heat exchanger 48 to the wind turbine installation site as a unit. This arrangement would overcome the need to transport the heat exchanger to the wind turbine installation site separately from the nacelle 14 and position the heat exchanger 48 on the nacelle 14 (such as on the roof 40 of the nacelle 14) at the wind turbine installation site. Thus, when the nacelle 14 is positioned on the tower 12, the heat exchanger 48 is already in position for assembly of the cooler 38. The only assembly that would be performed is the coupling of the support frame 46 to the nacelle 14 and the deployment and coupling of the heat exchanger 48 to the support frame 46. Again, this may be configured to occur while the nacelle 14 is on the ground or deck of a ship, or when the nacelle 14 is positioned on the tower 12.

In an exemplary embodiment, the cooler 38 may be located near the rear of the nacelle 14, as illustrated in the figures. For example, the heat exchanger 48 of the cooler 38 is preferably positioned within a few meters (e.g., within 2 meters) of the rear end of the nacelle 14. This position of the cooler 38 may provide some advantages to the air flow through the cooler 38. In this regard, the area behind the nacelle 14 represents a potential void of relatively low pressure. Thus, when the air flows through the cooler 38, it may be pulled or drawn into the region behind the nacelle 14. Thus, the air flow through the cooler 38 may be enhanced. If the cooler were located more toward the front of the nacelle 14, then the flow that passes through the cooler 38 would essentially see the roof 40 of the nacelle 14, which does not allow for an expansion of the flow. Thus, enhanced air flow through the cooler 38 is not achieved in this circumstance.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A wind turbine, comprising:
   a tower;
   a nacelle coupled to the tower and housing one or more heat generating components;
   a rotor having at least one wind turbine blade coupled to the nacelle; and
   a cooler mounted to the nacelle and configured to cool the one or more heat generating components in the nacelle through a circulation of a working fluid, the cooler comprising:
      a support frame coupled to the nacelle; and
      a heat exchanger coupled to the support frame and configured to cool the working fluid by a passage of air over the heat exchanger,
      wherein the heat exchanger includes more than two cooling panels arranged in a zig-zag shaped pattern, arranged substantially vertically relative to each other, and each of the more than two cooling panels defines a confronting edge that extends in a generally horizontal direction.

2. The wind turbine of claim 1, wherein the more than two cooling panels are each substantially planar.

3. The wind turbine of claim 2, wherein adjacent cooling panels of the more than two cooling panels are angled relative to each other between 60 degrees and 120 degrees.

4. The wind turbine of claim 1, wherein adjacent cooling panels of the more than two cooling panels are pivotally coupled to each other.

5. The wind turbine of claim 4, wherein the adjacent cooling panels of the more than two cooling panels are coupled to each other by a hinge.

6. The wind turbine of claim 5, wherein the hinge is a double hinge allowing the adjacent cooling panels of the more than two cooling panels to pivot relative to each other in multiple directions.

7. The wind turbine of claim 5, wherein the hinge is a lockable hinge.

8. The wind turbine of claim 1, wherein the support frame of the cooler is mounted to the nacelle adjacent a rear end of the nacelle.

9. A cooler for a wind turbine having a nacelle, comprising:
a support frame configured to be mounted to the nacelle; and
a heat exchanger configured to be coupled to the support frame, the heat exchanger including more than two cooling panels pivotally connected to each other and movable between a collapsed configuration and an expanded configuration,
wherein in the expanded configuration, the more than two cooling panels are arranged in a zig-zag shaped pattern, arranged substantially vertically relative to each other, and each of the more than two cooling panels defines a confronting edge that extends in a generally horizontal direction, and
wherein a volume occupied by the heat exchanger in the collapsed configuration is less than the volume occupied by the heat exchanger in the expanded configuration.

10. The cooler of claim 9, wherein the collapsed configuration includes a stacked arrangement of the more than two cooling panels with each cooling panel positioned immediately adjacent another cooling panel.

11. The cooler of claim 10, wherein each of the more than two cooling panels is generally planar and the collapsed configuration includes a generally rectangular stacked arrangement of the more than two cooling panels.

12. The cooler of claim 9, wherein adjacent cooling panels of the more than two cooling panels are connected to each other by a hinge.

13. The cooler of claim 12, wherein the hinge is a double hinge.

14. The cooler of claim 12, wherein the hinge is a lockable hinge.

15. A method of assembling a cooler for a wind turbine having a nacelle, comprising:

mounting a support frame to the nacelle of the wind turbine;
providing a heat exchanger having more than two cooling panels pivotally connected to each other and movable between a collapsed configuration and an expanded configuration, wherein in the expanded configuration, the more than two cooling panels are arranged in a zig-zag shaped pattern, arranged substantially vertically relative to each other, and each of the more than two cooling panels defines a confronting edge that extends in a generally horizontal direction;
positioning the heat exchanger adjacent the support frame in the collapsed configuration;
connecting one end of the heat exchanger to the support frame;
moving the heat exchanger from the collapsed configuration to the expanded configuration; and
connecting a second end of the heat exchanger to the support frame to secure the heat exchanger to the support frame.

16. The method of claim 15, wherein the collapsed configuration is a vertically stacked arrangement of the more than two cooling panels, and the moving step further comprises moving the stacked arrangement in a substantially vertical direction.

17. A method of handling a nacelle of a wind turbine configured to have a cooler, comprising:
providing a nacelle at a first location;
providing a heat exchanger at the first location, the heat exchanger having more than two cooling panels pivotally connected to each other and movable between a collapsed configuration and an expanded configuration, wherein in the expanded configuration, the more than two cooling panels are arranged in a zig-zag shaped pattern, arranged substantially vertically relative to each other, and each of the more than two cooling panels defines a confronting edge that extends in a generally horizontal direction;
coupling the heat exchanger to the nacelle and positioning the heat exchanger in the collapsed configuration; and
transporting the nacelle to a second location separate from the first location with the heat exchanger coupled thereto.

18. The method of claim 17, wherein the collapsed configuration is a vertically stacked arrangement of the more than two cooling panels.

19. The method of claim 17, further comprising hoisting the nacelle to a top of a wind turbine tower with the heat exchanger coupled thereto.

20. The method of claim 17, further comprising:
mounting a support frame to the nacelle;
moving the heat exchanger from the collapsed configuration to the expanded configuration; and
coupling the heat exchanger to the support frame.

* * * * *